(No Model.)
O. C. WHITE.
ADJUSTABLE SUPPORT.
No. 566,360. Patented Aug. 25, 1896.
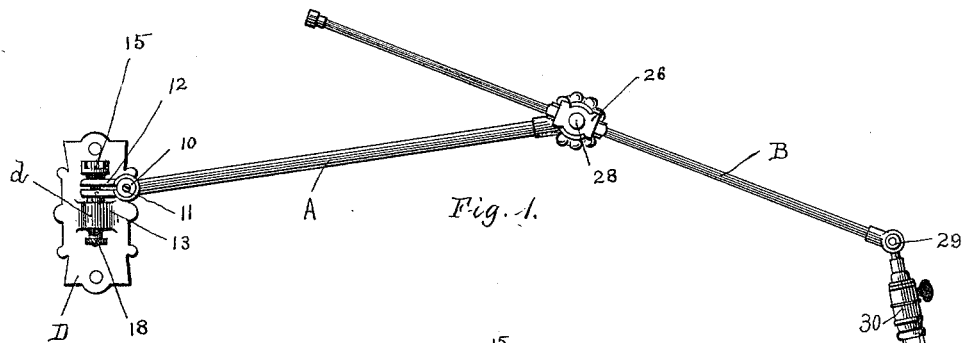
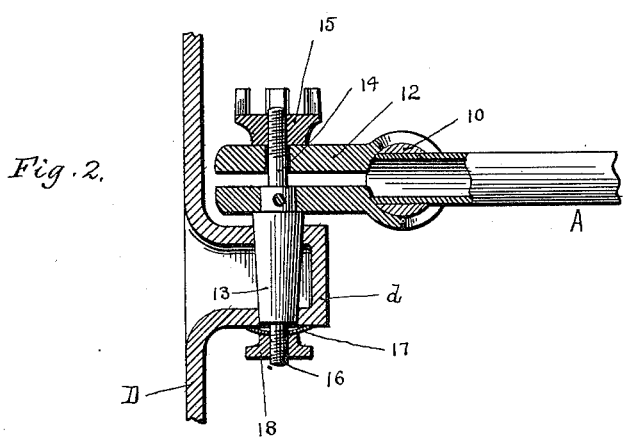
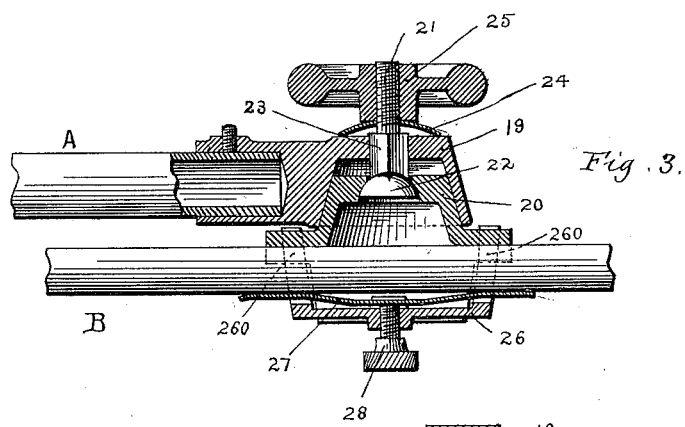
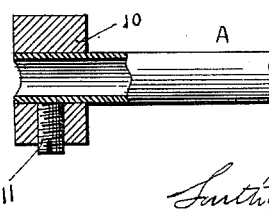
Witnesses:
Inventor.
O. C. White,
By
Southgate & Southgate
Attorneys

UNITED STATES PATENT OFFICE.

OTIS C. WHITE, OF WORCESTER, MASSACHUSETTS.

ADJUSTABLE SUPPORT.

SPECIFICATION forming part of Letters Patent No. 566,360, dated August 25, 1896.

Application filed June 13, 1895. Serial No. 552,675. (No model.)

*To all whom it may concern:*

Be it known that I, OTIS C. WHITE, a citizen of the United States, residing at Worcester, in the county of Worcester and State of Massachusetts, have invented a new and useful Improvement in Adjustable Supports, of which the following is a specification.

My invention relates to an adjustable support or bracket for electric lights or similar devices; and the object of my invention is to provide a support of this character which is capable of simple and convenient adjustment, and which may be held in its adjusted position by means of friction.

To these ends my invention consists of the parts and combinations of parts, as hereinafter described, and more particularly pointed out in the claims at the end of this specification.

In the accompanying drawings, Figure 1 is a side elevation of an adjustable support constructed according to my invention. Fig. 2 is a detail sectional view of the joints for supporting one of the rods or pipe-sections. Fig. 3 is a sectional view of the joint which I preferably employ for connecting the two rods or pipe-sections, and Fig. 4 is a detail view to be hereinafter referred to.

An adjustable support constructed according to my present invention comprises a bracket, which may be secured to the side of a wall or other desired location, a rod or pipe-section, which is mounted so that it can turn about the bracket in two directions, and a second rod or pipe-section, which is connected to the outer end of the first pipe-section by a combined slide-and-swivel joint, which will allow said pipe-section to turn, swivel, or be adjusted longitudinally to the desired position.

Referring to the drawings and in detail, A designates a rod or pipe-section which is provided at its end with a cylindrical socket-piece 10. In practice the socket-piece 10 may be formed integrally with the rod or pipe A, but I prefer to form the socket-piece 10 of hardened steel and to secure the same upon the rod or pipe-section A by means of a set-screw 11, as shown. Fitting upon and receiving the socket-piece 10 is a forked or split bearing-piece 12. Where this construction is adopted, the socket-piece 10 can be slipped longitudinally into the bearing-piece 12, and the end of the rod or pipe-section A can then be inserted in the socket-piece through a vertical slot in the forked piece and secured in place by the set-screw 11. By means of this construction it is to be noted that when the rod or pipe-section has been secured in place it will prevent the socket-piece from moving longitudinally in its bearings. One arm of the forked bearing-piece 12 is provided with a threaded shank or stud 14, and the friction exerted upon the socket-piece 10 may be adjusted by means of a nut 15.

As shown in the drawings, the adjusting-nut 15 is provided with upwardly-extending circumferential projections, and in practice I prefer to employ this construction, as the same is well adapted for receiving a screw-driver or other suitable instrument for adjusting the same.

Extending down and formed integrally from the stud 14 is a conical part or section 13, which may enter into and engage a conical socket formed in a hollow lug or projection d, extending out from the bracket or wall-plate D. The friction between the cone 13 and its bearings may be adjusted by means of a spring-washer 17 and an adjusting-nut 18, which is threaded on to a stud 16, formed integrally with said cone. By means of this construction it will be seen that the pipe-section A and its socket-piece 10 may be turned freely about the bearings in the forked piece 12, and may be held in the desired position by friction, the friction being controlled or regulated by the nut 15, and at the same time the forked-piece 12 and its cone 13 may be turned about the bracket D and may be frictionally held in position, the friction being regulated by means of the nut 18.

Secured on the outer end of the rod or pipe-section A is a piece 19, which forms one part of an elbow-joint.

If preferred, the part 19 may be formed integrally with the pipe-section A, but in practice I prefer to secure the same in place on the pipe-section by means of a set-screw, as shown.

The piece 20, which forms the other part of the elbow-joint, is provided with a conical section which fits into a conical socket in the piece 19. The parts 19 and 20 may be adjustably clamped together, and the friction exerted on the elbow-joint may be regulated by any desired means.

As shown in the drawings, 21 designates a stud or screw having a hemispherical head engaging a socket in the piece 20 and a square shank which engages with a square socket in the piece 19. By means of this construction it will be seen that the screw or stud 21 will turn with the part or piece 19, and as the clamping-nut is also carried by the piece 19 it will be seen that the working of the joint will have no tendency to unscrew or loosen the parts. Fitting on the stud 21 is a spring-washer 24, and the parts may be adjustably clamped together by means of a small hand-wheel, as 25. A second rod or pipe-section B is mounted in the piece 20, so that the same may turn or swivel therein, or may be shifted longitudinally, and will be retained in its adjusted position by a spring tension. As illustrated, the piece 20 is provided with a cover or section 26, having clenching-arms 260 for securing the same in place. A friction-spring, as 27, is mounted between the piece 26 and the rod or pipe-section B, the pressure of the spring upon the rod or pipe-section being controlled by a set-screw, as 28. At its outer end the rod or pipe-section B can be connected to the electric lamp or other fixture to be supported in any desired manner. As illustrated, the rod or pipe-section B is provided with an elbow-joint 29, which is connected to an electric lamp 30, so that said lamp can be swung or turned, as desired.

The feature which I regard of particular importance in an adjustable support constructed according to my invention resides in the fact that the lamp or other fixture to be supported can be readily moved into the desired position, that comparatively few joints are employed, and the friction exerted upon the joints may be adjusted or changed, as desired.

I am aware that many changes may be made in the construction of my adjustable support by those who are skilled in the art without departing from the scope of my invention as expressed in the claims, and I do not wish, therefore, to be limited to the construction which I have shown and described; but What I do claim, and desire to secure by Letters Patent of the United States, is—

1. In a device of the class described, the combination of a split or forked piece, a cylindrical socket-piece journaled in said forked piece, means for adjusting the friction between these parts, a rod or pipe-section, a set-screw for securing the rod or pipe-section in the socket-piece, said set-screw being threaded into the socket-piece, and arranged axially therein, the rod or pipe-section engaging with a vertical slot in the forked piece, and holding the socket-piece from moving longitudinally in its bearings therein, substantially as described.

2. The combination of a split or forked piece, a cylindrical socket-piece journaled therein, a threaded stud and nut for regulating the friction between these parts, a rod or pipe-section secured in the socket-piece, said rod or pipe-section engaging a vertical slot in the forked piece, and preventing the socket-piece from moving longitudinally in its bearings therein, a conical piece extending down from said forked piece, and journaled in a bracket, and a spring-washer and nut for regulating the friction upon said conical piece, substantially as described.

3. In a device of the class described, the combination of a bracket, a split or forked piece having a downwardly-extending conical section journaled in said bracket, a cylindrical socket-piece journaled in said forked piece, a rod or pipe-section engaging a vertical slot in the split or forked piece and arranged to prevent the cylindrical socket-piece from moving longitudinally, a second rod or pipe-section, and a combined swivel and slip joint for uniting said pipe-sections, substantially as described.

In testimony whereof I have hereunto set my hand in the presence of two subscribing witnesses.

OTIS C. WHITE.

Witnesses:
PHILIP W. SOUTHGATE,
E. M. HEALY.